May 20, 1958 N. GREENE ET AL 2,835,062
X-RAY FILM MOUNT
Filed May 28, 1956
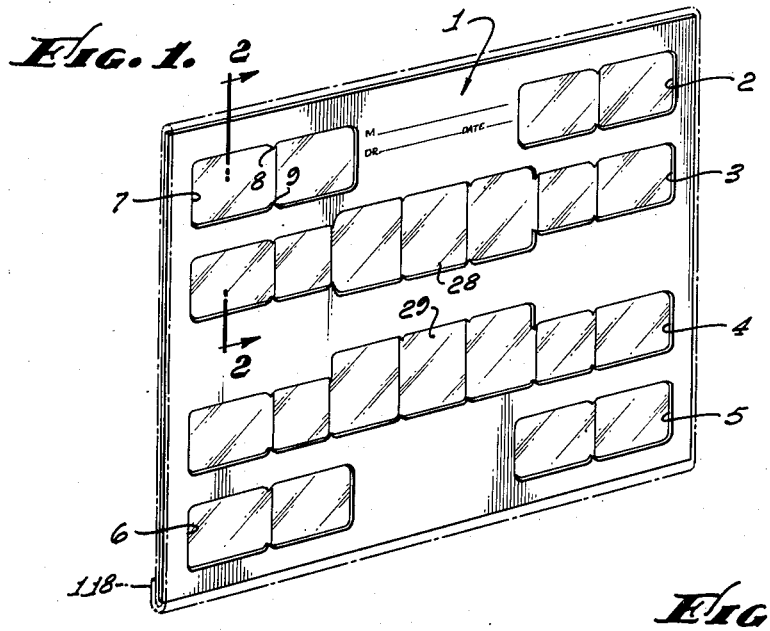
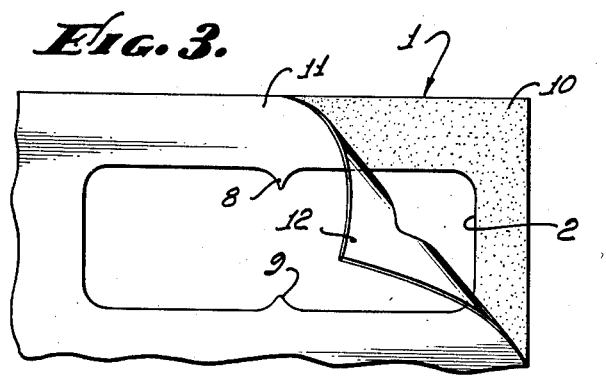
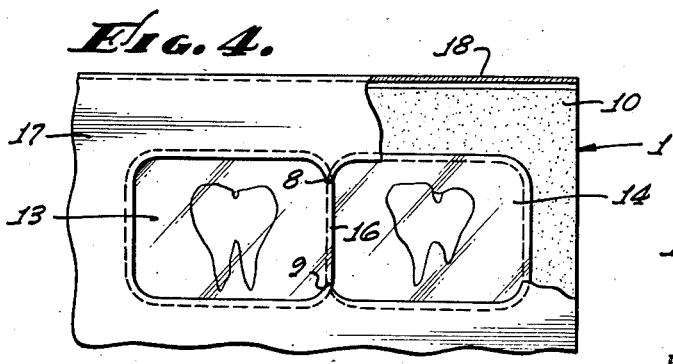
NATHAN GREENE
ROSE GREENE
INVENTORS,
BY
ATTORNEY.

United States Patent Office 2,835,062
Patented May 20, 1958

2,835,062

X-RAY FILM MOUNT

Nathan Greene and Rose Greene, Encino, Calif.

Application May 28, 1956, Serial No. 587,702

2 Claims. (Cl. 40—158)

The present invention relates to X-ray film mounts.

As a rule, X-ray films of a given area are sequentially exposed and thereby encompass divisions of the area. An object of the present invention is to provide a mount for the films which will allow viewing the film divisions without any interruptions therebetween.

Specifically, the invention is adaptable for dental X-ray film and wherein the tooth structure, as well as the jaw bone structure, may be observed without interruption from the right side of the mouth to the left side, or vice versa, thus giving a panoramic view without division of all of the teeth. Such a method as indicated is far superior to separating individual X-ray films as the structure under observation gives a doctor a better view of the particular areas under observation.

Other objects include an X-ray film mount which allows the X-ray film to be secured to the mount with a minimum of time and effort.

In the drawing:

Figure 1 is a perspective view of the mount enclosed within a transparent folder, Figure 2 is a sectional view on the line 2—2 of Figure 1 and on an enlarged scale, Figure 3 is a fragmentary view of a portion of the mount and showing mastic on one surface of said mount with disposable protective paper for said mastic separated in part from the mount, and, Figure 4 is a view similar to that of Figure 3, showing the two X-ray films secured to the mount with one leaf of the transparent folder overlying the film and secured by the mastic to the mount.

Referring now with particularity to the drawing, we provide a mount 1 which has two or more openings therein as indicated at 2 and 3. If a full X-ray of the entire mouth is contemplated, the particular mount will be provided with other X-ray film viewing openings, such as illustrated at 4, 5, 6 and 7. As a rule, X-ray film is rectangular in form and, accordingly, the longest length of said film may lie lengthwise of the mount, as shown for the openings 2, 5, 6 and 7, while other film may have the longest length thereof extending vertically and transversely of the mount as shown at 28 and 29. The mount 1 is preferably formed from a sheet of plastic which is provided with cut-out openings as shown, for instance, in Figure 3, and which are representative of the openings 2, 5, 6 and 7. These openings interconnect, the line of demarcation being the opposed pair of aligned tabs 8 and 9. Each opening subtends an area slightly less than the area of an X-ray film. Preferably, the mount on one face thereof is opaque, as indicated, and the cut-out openings provide interconnected clear portions through which the X-ray film may be observed. Preferably the opaque surface constitutes the outer face of the mount while the obverse face of said mount has a mastic applied thereto, as indicated in Figures 3 and 4, at 10. This mastic is characterized in that it is not liable to harden, is flexible, and initially protected by a covering sheet 11 having the same configuration as the mount 1, including the openings in said mount.

The operation, uses and advantages of the invention just described are as follows;

When it is desired to mount X-ray film on the mount, the sheet 11 which is secured to the mount by the mastic 10 is stripped from the mount, as indicated in Figure 3, at 12, so that the mastic surface is exposed. The X-ray technician then applies the X-ray film in a defined group order. Usually, an X-ray film extends from the right to the left, although this may be reversed, to show the left cuspids, the incisors, the right cuspids, and so on. Thus, as shown in Figure 4, X-ray film at 13 and 14 of adjacent or contiguous areas are applied to the mount and secured along marginal edges of said film by the mastic. The contiguous edges of the X-ray film are slightly overlapped, as shown at 15. Thus, when viewing the opaque surface of the mount, the two X-ray films will present an enlarged area of the teeth and jaw bone under inspection. After the different X-ray films have been secured to the mount on the mastic side and by the mastic, the mount as an entirety is placed within a transparent folder which has two leaves 16 and 17, the leaves being interconnected at 18 with one of the leaves provided with a returned portion 118 for receiving the edge of the opposite leaf, as shown in Figure 1. One of said leaves is pressed against the mastic side of the mount and acts as a holding member for the X-ray film, which is also secured by the mastic to said mount. The opposite leaf overlies the front of the mount and the X-ray film. As stated, the folder is formed of a thin, transparent plastic, and each leaf subtends the same area as the area of the mount.

While we have described our invention as including a mount having an opaque surface with openings through said mount through which X-ray film may be observed, it is within contemplation of our invention that in place of the openings that said openings may be transparent areas, as long as the transparent areas are surrounded by opaque portions and the transparent areas are interconnected. The mastic surface would be used on such a construction, as would likewise the folder.

The present invention lends itself admirably to trimming and blocking of the areas which receive the X-ray film.

We claim:

1. An X-ray film mount including a sheet of material provided with interconnected and aligned light pervious portions, and short length aligned tabs extending into said light pervious portions for indicating division areas therebetween.

2. An X-ray film mount, including a sheet of material provided with interconnected and aligned light pervious portions adapted to have a group of X-ray film arranged to register with said light pervious portions with the contiguous edges of each X-ray film of the group slightly overlapped to thereby provide an enlarged uninterrupted area of view of the objects appearing on said X-ray film, and short length aligned tabs extending into said light pervious portions for indicating the division areas between each X-ray film of the group.

References Cited in the file of this patent

UNITED STATES PATENTS

| | | |
|---|---|---|
| 1,474,174 | Segall | Nov. 13, 1923 |
| 1,730,883 | Grant | Oct. 8, 1929 |
| 2,291,173 | Simpson | July 28, 1942 |
| 2,432,515 | De Sherbinin | Dec. 16, 1947 |
| 2,699,103 | Stasikewich | Jan. 11, 1955 |